(12) United States Patent
Petrica et al.

(10) Patent No.: US 10,088,891 B2
(45) Date of Patent: Oct. 2, 2018

(54) MULTI-CORE COMPUTER PROCESSOR BASED ON A DYNAMIC CORE-LEVEL POWER MANAGEMENT FOR ENHANCED OVERALL POWER EFFICIENCY

(71) Applicant: Cornell University, Ithaca, NY (US)

(72) Inventors: Paula Petrica, Portland, OR (US);
Adam M. Izraelevitz, Ithaca, NY (US);
David H. Albonesi, Ithaca, NY (US);
Christine A. Shoemaker, Ithaca, NY (US)

(73) Assignee: Cornell University, Ithaca, NY (US)

( * ) Notice: Subject to any disclaimer, the term of this patent is extended or adjusted under 35 U.S.C. 154(b) by 100 days.

(21) Appl. No.: 14/494,568

(22) Filed: Sep. 23, 2014

(65) Prior Publication Data
US 2015/0185816 A1 Jul. 2, 2015

Related U.S. Application Data

(60) Provisional application No. 61/881,444, filed on Sep. 23, 2013.

(51) Int. Cl.
*G06F 1/32* (2006.01)
(52) U.S. Cl.
CPC ............ *G06F 1/3287* (2013.01); *G06F 1/329* (2013.01); *G06F 1/3243* (2013.01);
(Continued)
(58) Field of Classification Search
CPC ......... G06F 1/387; G06F 1/3243; G06F 1/329
See application file for complete search history.

(56) References Cited

U.S. PATENT DOCUMENTS 8,670,960 B2 * 3/2014 Couet ................. G06F 17/11
  703/10
9,329,666 B2 * 5/2016 Shippy ................. G06F 1/3287
(Continued)

OTHER PUBLICATIONS

Fatahalian, Kayvon, "From Shader Code to a Teraflop:How Shader Cores Work", Siggraph2008 p. 14 and 43.*
(Continued)

*Primary Examiner* — Jaweed A Abbaszadeh
*Assistant Examiner* — Cheri Harrington
(74) *Attorney, Agent, or Firm* — Perkins Coie LLP

(57) ABSTRACT

The present disclosure provides methods and systems for managing power in a processor having multiple cores. In one implementation, a microarchitecture of a core within a general-purpose processor may include configurable lanes (horizontal slices through the pipeline) which can be powered on and off independently from each other within the core. An online optimization algorithm may determine within a reasonably small fraction of a time slice a combination of lanes within different cores of the processor to be powered on that optimizes performance under a power constraint budget for the workload running on the general-purpose processor. The online optimization algorithm may use an objective function based on response surface models constructed to fit to a set of sampled data obtained by running the workload on the general-purpose processor with multiple cores, without running the full workload. In other implementations, the power supply to lanes can be gated.

34 Claims, 10 Drawing Sheets

(52) U.S. Cl.
CPC .......... *Y02D 10/152* (2018.01); *Y02D 10/171* (2018.01); *Y02D 10/24* (2018.01)

(56) References Cited

U.S. PATENT DOCUMENTS

| | | | | |
|---|---|---|---|---|
| 9,811,389 B2* | 11/2017 | Rider | | G06F 9/5094 |
| 2002/0022935 A1* | 2/2002 | Murphy | | H04L 12/10 |
| | | | | 702/60 |
| 2005/0218943 A1* | 10/2005 | Padhye | | G06F 13/4072 |
| | | | | 327/109 |
| 2007/0142975 A1* | 6/2007 | Piche | | H02J 3/38 |
| | | | | 700/286 |
| 2008/0201117 A1* | 8/2008 | Wong | | G06F 17/5009 |
| | | | | 703/2 |
| 2010/0229012 A1* | 9/2010 | Gaskins | | G06F 1/3296 |
| | | | | 713/322 |
| 2010/0235011 A1* | 9/2010 | Tolia | | G06F 1/28 |
| | | | | 700/296 |
| 2010/0295852 A1* | 11/2010 | Yang | | G06F 1/3203 |
| | | | | 345/426 |
| 2011/0213508 A1* | 9/2011 | Mandagere | | G06F 1/3203 |
| | | | | 700/291 |
| 2011/0228945 A1* | 9/2011 | Mihelich | | H04R 3/002 |
| | | | | 381/59 |
| 2012/0005505 A1* | 1/2012 | Tolia | | G06F 1/206 |
| | | | | 713/320 |
| 2012/0297232 A1* | 11/2012 | Bircher | | G06F 1/324 |
| | | | | 713/500 |
| 2013/0054988 A1* | 2/2013 | Litovtchenko | | G06F 1/3203 |
| | | | | 713/300 |
| 2013/0173933 A1* | 7/2013 | Ramani | | G06F 1/3228 |
| | | | | 713/300 |
| 2013/0286026 A1* | 10/2013 | Kaburlasos | | G06F 1/324 |
| | | | | 345/501 |
| 2014/0095912 A1* | 4/2014 | Hurd | | G06F 1/3234 |
| | | | | 713/323 |
| 2014/0181561 A1* | 6/2014 | Shippy | | G06F 1/3287 |
| | | | | 713/324 |
| 2014/0281609 A1* | 9/2014 | Hanumaiah | | G06F 1/206 |
| | | | | 713/320 |
| 2014/0359330 A1* | 12/2014 | Gendler | | G06F 1/3206 |
| | | | | 713/323 |
| 2015/0046685 A1* | 2/2015 | Park | | G06F 1/3243 |
| | | | | 712/220 |
| 2015/0058645 A1* | 2/2015 | Katagiri | | G06F 3/0625 |
| | | | | 713/320 |
| 2015/0177823 A1* | 6/2015 | Maiyuran | | G06F 1/324 |
| | | | | 713/320 |
| 2015/0301572 A1* | 10/2015 | Zhou | | G06F 1/3203 |
| | | | | 713/320 |
| 2016/0147712 A1* | 5/2016 | Chiang | | G06F 17/11 |
| | | | | 708/446 |

OTHER PUBLICATIONS

"Complete search in continuous global optimization and constraint statisfaction", Acta Numerica, vol. 13, 2004.*
Bergamaschi, R. et al., "Exploring Power Management in Multi-Core Systems", Proceedings of the Asia and South Pacific Design Automation Conference, Jan. 2008, 6 pages.
Bitirgen, R. et al., "Coordinated Management of Multiple Interacting Resources in Chip Multiprocessors: A Machine Learning Approach", Proceedings of the International Symposium on Microarchitecture, Nov. 2008.
Chen, J. et al., "Modeling Program Resource Demand using Inherent Program Characteristics", SIGMETRICS Perform. Eval. Rev., Jun. 2011.
Dubach, C. et al., "A Predictive Model for Dynamic Microarchitectural Adaptivity Control", Proceedings of the International Symposium on Microarchitecture, Dec. 2010.
Isci, C. et al., "An Analysis of Efficient Multi-Core Global Power Management Polocies: Maximizing Performance for a Given Power Budget", Proceedings of the International Symposium on Microarchitecture, Dec. 2006.
Lee, B.C. et al., "CPR: Composable Performance Regression for Scalable Multiprocessor Models", Proceedings of the International Symposium on Microarchitecture, Nov. 2008.
Petrica, P. et al. "Dynamic Power Redistribution in Failure Prone CMPs.", 2010, 6 pages.
Petrica, P. et al., "Flicker: A Dynamically Adaptive Architecture for Power Limited Multicore Systems", ISCA, Jun. 2013, 11 pages.
Wenisch, T.F. et al., "SimFlex: Statistical Sampling of Computer System Simulation", IEEE Micro, Jul./Aug. 2006.

* cited by examiner

MULTI-CORE COMPUTER PROCESSOR BASED ON A DYNAMIC CORE-LEVEL POWER MANAGEMENT FOR ENHANCED OVERALL POWER EFFICIENCY

PRIORITY CLAIM AND RELATED PATENT APPLICATIONS

This patent document claims priority to and benefit of U.S. Provisional Patent Application No. 61/881,444 entitled "MULTI-CORE COMPUTER PROCESSOR BASED ON A DYNAMIC CORE-LEVEL POWER MANAGEMENT FOR ENHANCED OVERALL POWER EFFICIENCY" and filed on Sep. 23, 2013, which is incorporated by reference in its entirety as a part of this document.

STATEMENT REGARDING FEDERALLY SPONSORED RESEARCH OR DEVELOPMENT

This invention was made with government support under grants CCF-0916821, CCF-0811729, and CNS-0708788 awarded by the National Science Foundation (NSF). The government has certain rights in the invention.

BACKGROUND

This patent document relates to power management in multi-core processors.

Microprocessors are required to perform processing tasks and operations with reduced power consumption in various computing devices, systems and applications. In some applications, a microprocessor may be constrained in its power consumption so that not all transistors within the microprocessor may be able to be powered on at the same time. Accordingly, in various microprocessors and devices or systems based on microprocessors, the devices or systems may be required to nimbly adapt to changes in the chip power that is allocated to general-purpose cores and/or to specialized accelerators.

SUMMARY

Methods, systems, and devices are disclosed for managing power in a multi-core processor.

The present disclosure provides techniques and systems for managing power in a processor having multiple cores. In some embodiments, each core of the multiple cores of the processor is partitioned into multiple power regions, and each power region is further partitioned into multiple lanes, and a lane is a horizontal pipeline slice. The system receives a power constraint budget and a workload, and determines by an online optimization algorithm within a reasonably small fraction of a time slice a combination of powered lanes within different cores of the processor that optimizes performance under the power constraint budget for the workload.

In some embodiments, a core of the multiple cores of the processor is partitioned into three power regions each comprising a plurality of pipeline stages: a front end region, an execute region, and a memory region. The front end region may further comprise a fetch, a decode, a reorder buffer, a rename, and a dispatch stage; the execute region may further comprise an issue queue, a register file, and a functional unit; and the memory region may further comprise a load queue and a store queue.

In some embodiments, a lane may comprise a sub-bank of associated queue. A lane may further comprise a physical gating mechanism and a logical correctness mechanism. The physical gating mechanism may comprise a sleep transistor. The processor may comprise 32 cores, and the time slice may comprise 100 ms.

In some embodiments, the time slice may comprise a configuration sampling phase, a surrogate surface fitting phase, an optimization phase, and a steady phase. The workload runs for a short sampling period during the configuration sampling phase on the multiple cores of the processor to collect a set of sampled data. A performance response surface model or a power response surface model may be constructed to fit to the set of sampled data during the surrogate surface fitting phase. The online optimization algorithm using an objective function based on the response surface models determines the combination of powered lanes within different cores of the processor that optimizes performance under the power constraint budget for the workload during the optimization phase. Finally, the processor operates under the combination of powered lanes within different cores during the steady phase. Overall, the configuration sampling phase, the surrogate surface fitting phase, and the optimization phase together are within the reasonably small fraction of the time slice.

In some embodiments, the online optimization algorithm that optimizes performance under the power constraint budget for the workload is applied to a multivariate statistical experimental design with a set of responses and a set of factors. A response may be a sampled datum collected from the workload running for a short sampling period, and a factor may be a power region of a core. For example, a response may be a sampled throughput datum or a sampled power consumption datum collected from the workload running for a short sampling period.

In some embodiments, a core of the multiple cores of the processor is partitioned into three power regions each comprising a plurality of pipeline stages: a front end region, an execute region, and a memory region; a factor is a front end region, an execute region, or a memory region; and a response is a sampled datum collected from the workload running for a short sampling period on a full factorial design of the factors, a Box-Behnken design of the factors, or a fractional factorial design of the factors.

In some embodiments, a response is a sampled datum collected from the workload runs for a 1 ms sampling period. Alternatively, a response is an average of a set of sampled data collected for a plurality of subintervals of a sampling period. The performance response surface model or the power response surface model may be constructed using a first order polynomial, a second order polynomial, or an interpolating model that places a Radial Basis Function (RBF) at each sampled datum. The online optimization algorithm may incorporate a genetic algorithm.

In some embodiments, a method for managing power in a processor having multiple cores is presented, wherein each core may include different partitioned power regions and each power region may be partitioned into multiple lanes with each lane including processor components. The method may control power to the processor by independently controlling electrical power to the lanes, and controlling power levels supplied to components within each lane by a gating control. The method may apply an optimization algorithm within a small fraction of a time slice to determine a combination of powered-on lanes within different cores of the processor that optimizes performance of the processor under a power constraint budget. In some embodiments, the gating control in controlling electrical power to a lane may be performed by clock gating, power gating, or voltage scaling.

These and other aspects, features and their implementations and variations are described in greater detail in the drawings, the description and the claims.

DETAILED DESCRIPTION

Figure 1:
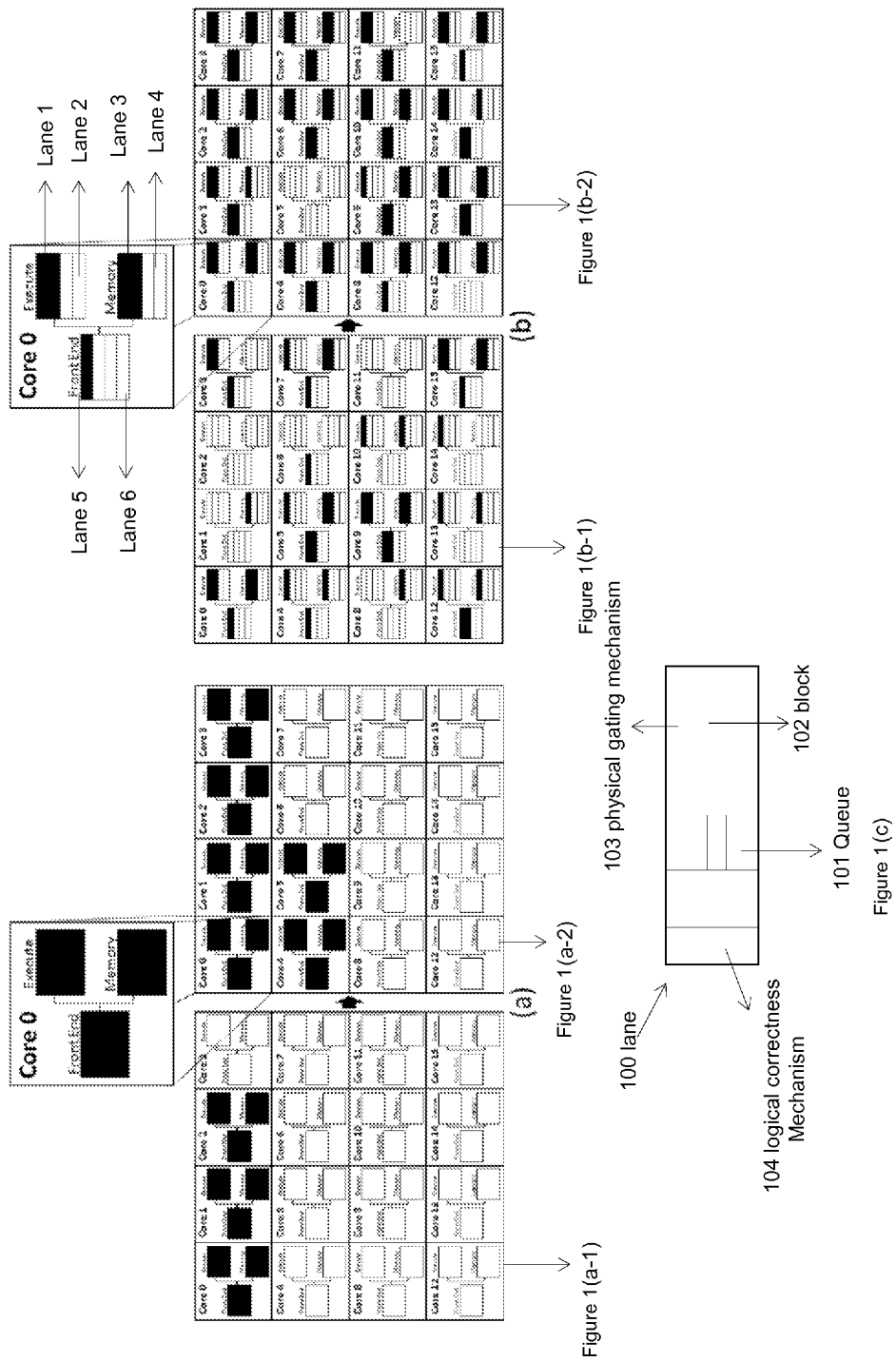
FIGS. 1(*a*-1), 1(*a*-2), 1(*b*-1), 1(*b*-2), and 1(*c*) illustrate the operation and structure of power management of a processor with multiple cores, using the core-level gating technique, and the presently disclosed techniques called Flicker for managing power of multiple cores within a processor, wherein a core comprises multiple lanes.

This patent document discloses methods and systems to manage a workload running on a computer processor such as a microprocessor or a general-purpose processor with multiple cores that can dynamically adapt to varying and potentially stringent power constraint budgets. A microarchitecture of a core within a computer processor or general-purpose processor may include different and configurable processor regions or lanes (e.g., horizontal slices through the pipeline) which can be powered on and off independently from one other within the core of the processor. An online optimization algorithm may determine within a reasonably small fraction of a time slice a combination of lanes within different cores of the processor to be powered on that optimizes performance under a power constraint budget for the workload running on the general-purpose processor, without requiring offline training, microarchitecture state, or foreknowledge of the workload. The online optimization algorithm may use an objective function based on response surface models constructed to fit to a set of sampled data obtained by running the workload on the general-purpose processor with multiple cores, without running the full workload.

Computer processors and general-purpose processors are becoming increasingly heterogeneous and power constrained. A computer processor or general-purpose processor may include multiple cores augmented by a range of accelerators that are tailored to execute particular types of applications. In various applications, these processors may be power constrained so that not all transistors will be powered on at the same time, causing a "dark silicon problem" that requires the system to be nimble in terms of power allocation. During time quanta when few applications can be mapped to the accelerators, the multiple cores of a general-purpose processor may be allocated full power. On the other hand, at high accelerator usage, the power allocation to the multiple cores may be severely capped, and the hardware must flexibly adapt to these constantly changing power constraint budgets while ideally maximizing throughput at each power constraint budget. Methods and systems proposed in this patent document address the problem of optimizing the performance of a general-purpose processor with multiple cores that needs to efficiently adapt to varying, and at times stringent power constraint budgets.

Various other power management techniques exist for multiple cores within a general-purpose processor and some of such techniques have some shortcomings. For example, the dynamic voltage and frequency scaling (DVFS) technique is largely ineffective due to the aggressive push of scale voltages toward the near-threshold regime. Core-level gating is a technique that each core is placed in a separate voltage domain that can be gated through the use of power transistors, which can be controlled to have a number of cores enabled under a given power constraint budget. However, various implementations of core-level gating have drawbacks such as the coarse granularity of power control where an entire core is powered on or off together and such an implementation can fail to adapt the hardware to the characteristics of the workload, and some implementations may require the operating system scheduler to adapt to a varying number of available cores.

On the other hand, implementations of microarchitecture adaptation techniques can dynamically adapt fine-grain components within each core in order to match application or workload requirements, which addresses the limitations of core-level gating. However, some implementations of the microarchitecture adaptation technique suffer from a large number of fine-grain voltage domains implemented within the pipeline of each core and the large amount of time needed to solve the complex problem in order to determine the combination of dozens of power knobs on each of tens of cores that maximizes throughput under the given power constraint budget.

The methods and systems in this document can be based on a microarchitecture of a core including configurable lanes (horizontal slices through the pipeline) within an individual core to run the workloads or applications, which has lower overhead than microarchitecture adaptation technique, and greater flexibility than core-level power gating. The methods and systems divide each pipeline section within each core into lanes, where a lane is a horizontal slice through the pipeline. Each lane in a core constitutes an individually controllable power domain. Such a core microarchitecture bridges the gap between fine-grain components of the microarchitecture adaptation technique and the entire core level of the core-level gating. The pipeline is power-gated at the granularity of lanes, which permits a rapid adaptation of the width of different pipeline regions. While cores are homogeneous in design, they can be dynamically reconfigured into a heterogeneous multiple core system that meets power constraints by powering on and off different lanes within a core.

FIG. 1(*a*-1) and FIG. 1(*a*-2) show a general processor with 16 cores using core-level gating technique to manage the power of the multiple cores, while FIG. 1(*b*-1) and FIG. 1(*b*-2) show a general processor with 16 cores using a microarchitecture of a core comprising configurable lanes which can be powered on and off independently from each other within the core. The system and associated processing methods shown in FIG. 1(*b*-1) and FIG. 1(*b*-2) are referred to as "Flicker" in this document. The 16 cores are shown merely for example. There may be other number of cores such as 32 cores in a general-purpose processor.

For core-level gating cores as shown in FIG. 1(*a*-1) and FIG. 1(*a*-2), a number of cores are entirely shut down, shown as black, depending on the power constraint budget. The more stringent a power constraint budget is, the more cores are shut down. The cores shown in FIG. 1(*a*-2) operates at a more stringent power constraint budget than the cores shown in FIG. 1(*a*-1) does, therefore there are more cores shutting down, shown as black in FIG. 1(*a*-2), than the number of cores shutting down, shown as black in FIG. 1(*a*-1).

For Flicker system as shown in FIG. 1(*b*-1) and FIG. 1(*b*-2), a core may include multiple lanes. For example, the core 0 may include lane 1, lane 2, lane 3, lane 4, lane 5, and lane 6. The lanes shown in black are shut down, such as lane 1, lane 3, and lane 5, while the lanes shown in white are powered up, such as lane 2, lane 4, and lane 6. Therefore all cores remain operational in FIG. 1(*b*-1) and FIG. 1(*b*-2), but lanes within each core may be powered down depending on application characteristics of the workload. In this manner, Flicker provides finer grain allocation of power to workloads according to their need for particular pipeline resources.

Similarly, the more stringent a power constraint budget is, the more lanes are shut down. The cores shown in FIG. 1(*b*-2) operates at a more stringent power constraint budget than the cores shown in FIG. 1(*b*-1) does, therefore there are more lanes shutting down, shown as black in FIG. 1(*b*-2) than the number of lanes shutting down, shown as black in FIG. 1(*b*-1).

More details of the lanes within a core are shown in FIG. 1(*b*-2) and FIG. 1(*c*). Each core may include multiple power regions. For example, as shown in FIG. 1(*b*-2), a core 0 may include three power regions: a front end region, an execute region, and a memory region. Each power region further includes a plurality of pipeline stages. For example, the front end region includes a fetch, a decode, a reorder buffer (ROB), a rename, and a dispatch stage; the execute region may include an issue queue, a register file, and a functional unit; and the memory region may include a load queue and a store queue. The number of power regions, the number of pipeline stages described above are merely examples, and not limiting. There may be other number of power regions, with a different number of pipeline stages, where the presently disclosed methods and systems can be applied to.

Many existing techniques may be used for implementing the components described above. For example, to implement the fetch and the ROB, a circular structure with spares may be used. The queue for the issue may be based on a coarse-grain partitioned RAM/CAM queue that dynamically adapts its size to program demands. Other techniques at a coarse-grain level may be used by banking the queues and powering off an entire bank.

Each of the power region may further include multiple lanes, and a lane is a horizontal pipeline slice. For example, the front end region shown in FIG. 1(*b*-2) may include four lanes, while the execute region may include three lanes. Each lane within a power region can be powered on or off independently from each other. For example, as shown in FIG. 1(*b*-2), two lanes in the memory power region within the core 0 remain powered on shown as white while other lanes are off shown as black. In addition to the lanes in a power region, the power region may contain other functional units which may be on all the time, such as an Integer Multiplier, which typically needs to remain powered on for proper operation. Such functional units are not included in the lanes.

As shown in FIG. 1(*c*), a lane 100 may further include an associated queue 101, even though such a queue is not technically a part of the pipeline "width." The associated queue 101 within the lane may be optional and can be downsized to save power. A lane may further include a physical gating mechanism 103, a logical correctness mechanism 104, and a plurality of functional blocks 102. The physical gating mechanism 103 may include sleep transistors to act as a power gate for a functional block 102 within a lane. In addition, the physical gating mechanism may also be used to power down a portion of the queue 101.

The logical correctness mechanism 104, which may be always powered in some implementations, ensures proper pipeline operation when some lanes are powered off. For instance, powering off a lane within the front end region may prevent instructions from being slotted into the powered off lane. When a lane is powered off within the back end region, a functional unit associated with the powered off lane is marked as perpetually in use within the issue queue selection logic.

In some implementations, the physical gating mechanism 103 of functional blocks 102 are aggregated into six individually controllable power-gated lanes, two for each of the front end region, execute region, and memory region. The physical gating mechanism 103 may include a sleep transistor or a plurality of sleep transistors. Supply voltage levels may be slightly increased to account for the voltage drop across the sleep transistors. The sleep transistor area overhead estimates vary from 2-6% depending on the implementation, size of clusters, and technology node. In some embodiments, advanced sleep transistor sizing algorithms can considerably reduce the area overhead. In addition to the sleep transistors, area overheads are introduced by additional decoupling capacitance that is incorporated to reduce voltage fluctuations, resulting in a total estimated overhead of 15% for some other embodiments.

A program may run on the general processor Flicker containing multiple cores shown in FIG. 1(*b*-1) and FIG. 1(*b*-2) to periodically characterize application behavior or a workload and determine the combination of lanes to be powered on that maximizes performance without exceeding a power constraint budget at any given moment. The program may do so by an online optimization algorithm. An online optimization algorithm can handle a sequence of requests or inputs without knowledge of the future requests or inputs. The program is also referred to as Flicker, just like the hardware component, the processor Flicker. The term Flicker may refer to both the hardware and the software.

Various existing approaches to managing power for multiple cores within a general processor either are based on offline optimization, limited to uniprocessor, or need training data. Compared with those existing approaches, Flicker uses an substantially online approach based on reduced sampling techniques, constructing response surface models based on the sampled data, and applying online optimization using the response surface models, which converges quickly to a near-optimal solution. The Flicker approach is a "black box" approach without any knowledge of the future data and no training is needed; therefore Flicker can adapt on-the-fly to different machine microarchitectures and to machines that run a wide variety of applications or workloads.

In Flicker, the characterization of each running process of a workload running on the general processor is formulated as a multivariate statistical experimental design, which results in an empirical model that correlates hardware resource allocation with power and performance. This design is used by the Flicker optimization algorithm to maximize global performance within the power constraint budget that is allocated for each time slice interval.

Figure 2:
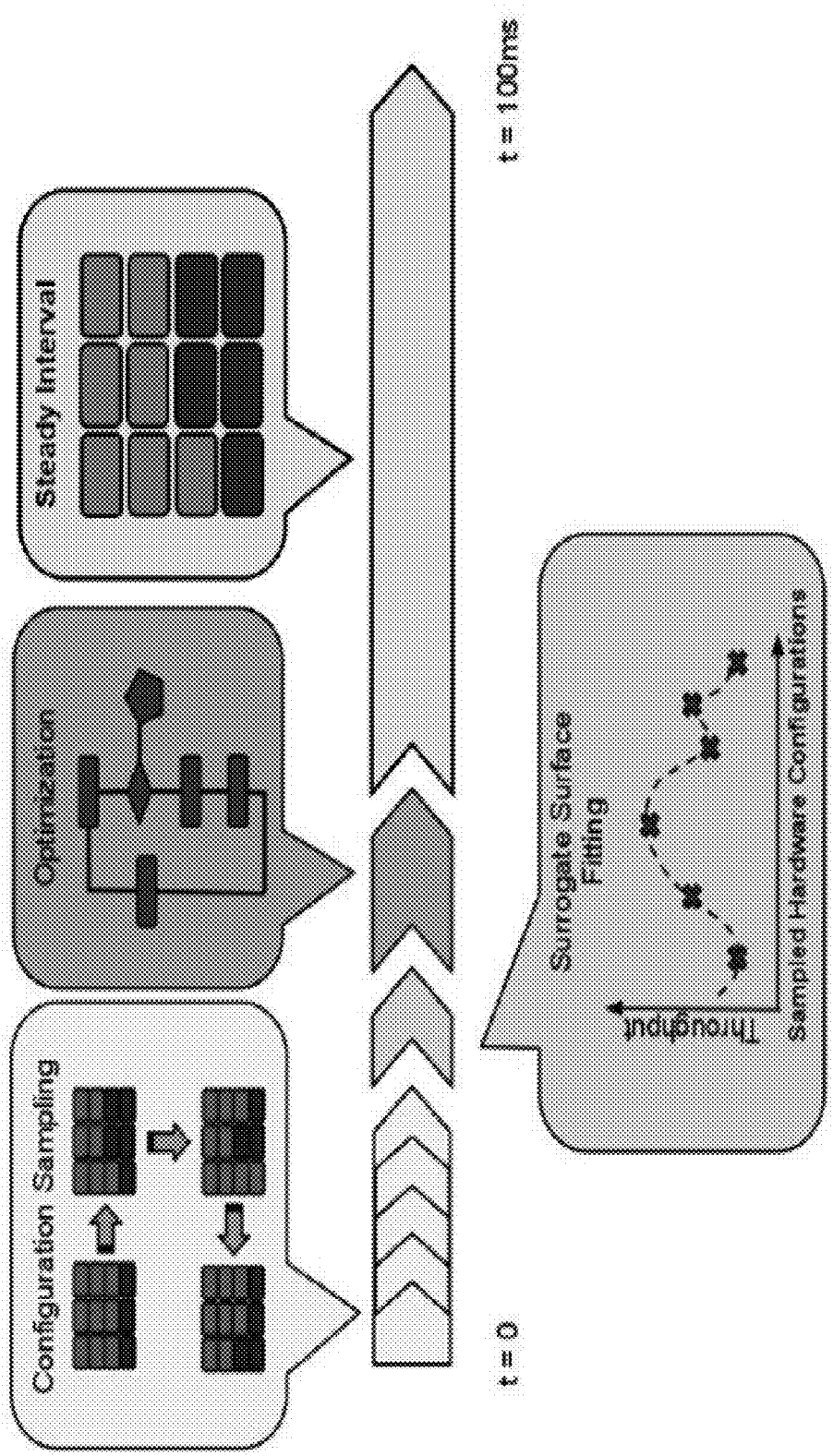
FIG. 2 illustrates the operation of Flicker within a time slice.

FIG. 2 illustrates an example of the operation of the Flicker program in one embodiment. The run time may be divided into time slices. The duration of a time slice may be 100 microsecond. Other length of a time slice duration may be possible as well. In certain embodiments, it may be possible that some time slices may have different lengths from others.

As illustrated in FIG. 2, a time slice may include four phases: a configuration sampling phase, a surrogate surface fitting phase, an optimization phase, and a steady phase. The configuration sampling phase, the surrogate surface fitting phase, and the optimization phase together are within a reasonably small fraction of the time slice, so that the majority of the time during a time slice is used to run the application or workload on the multiple cores in the steady phase. A reasonably small fraction of the time slice may be in a range of about 1% of the time slice for some embodiment. For some other embodiments, a reasonably small fraction of the time slice may be in a range of about 30% of the time slice. The numbers such as 1% or 30% are merely examples and not limiting. There areother cases where the reasonably small fraction is of other numbers, such as a number less than 50%.

During the configuration sampling phase, an application or a workload runs for short sampling periods on the multiple cores of the processor to collect a set of sampled data, each of which has a different combination of enabled lanes. In some embodiment when the cores are identical, the sampling on all the cores, such as 32 cores, can occur in parallel. In some other embodiments, the samplings are staggered to avoid global power overshoots. Enhanced sampling techniques significantly reduce the sampling time over full sampling and increase sampling accuracy are possible as well, which will be disclosed later.

During the surrogate surface fitting phase, a performance response surface model or a power response surface model may be constructed to fit to the set of sampled data. A response surface model (or surrogate model) is an inexpensive approximation of computationally expensive functions for which an a priori description or formula is not available, and information can only be obtained through time-consuming direct evaluation of the functions. These models are particularly well-suited to approximate global throughput and power on a Flicker core, since they construct response functions from a subset of function evaluations obtained through sampling.

During the optimization phase, the online optimization algorithm using an objective function based on the response surface models determines the combination of powered lanes within different cores of the processor that optimizes performance under the power constraint budget for the workload.

During the steady phase, the processor operates under the combination of powered lanes within different cores for the remainder of the time slice interval. After this time, the process is repeated if the operating system schedules different threads or changes the power limit.

As noted earlier, in Flicker, the characterization of each running process of a workload running on the general processor is formulated as a multivariate statistical experimental design, which results in an empirical model that correlates hardware resource allocation with power and performance. Multivariate statistics provide the ability to analyze complex sets of data, where there are many independent variables and possible dependent variables which are correlated to each other to varying degrees. There are two types of variables in a multivariate statistical experimental design: responses and factors. Variables that are correlated with one another which are also largely independent of other subsets of variables are combined into factors. On the other hand, response variables are observed (or sampled) output values dependent on the values taken on by the factors.

For Flicker, the factors are the controlled independent variables that affect the response of the system. In some embodiments, a factor may represent a power region of a core, wherein a core includes multiple power regions. For example, a core may include three power regions: the front end, the execute, and the memory, which may be the factors of the multivariate statistical experiment, denoted as $X_1$, $X_2$, and $X_3$, respectively. The factors may take on the value of the number of lanes within the power region. For example, if each of the power regions has 4 lanes, then each of the factors may take on three different levels (four active lanes—fully provisioned, three active lanes, and two active lanes). Thus, there are $3^3=27$ configurations for each core. For some other embodiments, the number of lanes within a power region may be different, and each of the factor may take on different values. The value for one factor may be different for values of another factors.

For Flicker, the responses may be sampled output values collected from the workload running for a short sampling period, depending on the values taken on by the factors. In some embodiments, the response variables are the throughput and power consumption of the running workload, and the goal is to characterize the effect of different lane allocations on these variables in order to obtain an optimal resource allocation. In some embodiments, a response may be a sampled datum collected from the workload running for a short sampling period on a full factorial design of the factors, a Box-Behnken design of the factors, or a fractional factorial design of the factors.

Figure 3:
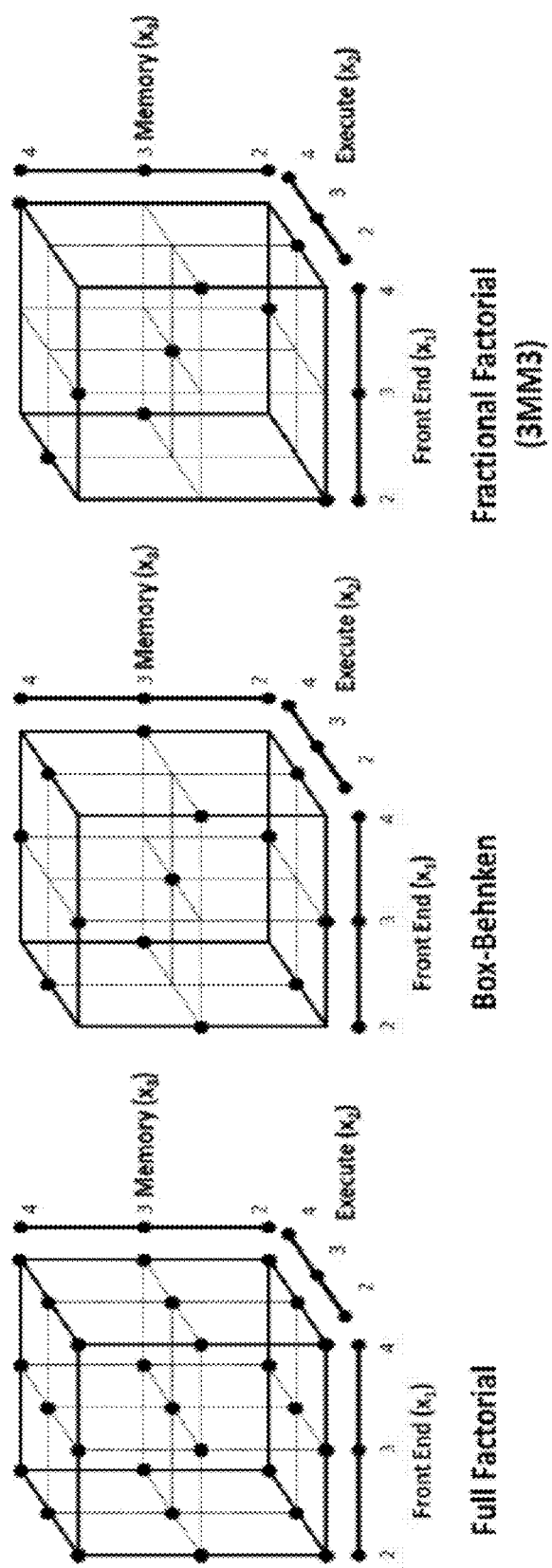
FIG. 3 illustrates the various sampled core configurations for the full factorial design, the Box-Behnken design, and the fractional factorial design.

As illustrated in the left figure in FIG. 3, in a full factorial design in the illustrated implementation, there are 3 power regions of a core, with 4 lanes in each core, resulting a total 27 core configurations for each core, and all 27 core configurations are sampled and their effect on the response variables is measured. The design space is represented as a cube, with the edges representing the levels of the factors, the corners indicating the high and low values of each factor, and the dots marking the sampled configurations as dictated by the experimental design.

The large number of samples needed for a full factorial design limits its usefulness in runtime applications, since a large portion of the operating system time slice may be spent sampling suboptimal configurations of the factors. To address this issue, in some embodiments, two other methods are explored that reduce the cost of experimentation while estimating response surface parameters with high precision: the Box-Behnken design of the factors, and fractional factorial design of the factors. The Box-Behnken design of the factors and fractional factorial design of the factors are based on the sparsity-of-effects principle: the highest contributor variables to responses are likely to be the main (single factor) and low-level (two factor) interactions. Moreover, they are both balanced and orthogonal for optimal efficiency. In some other embodiments, other forms of factorial designs may be used as well.

As illustrated in the center figure in FIG. 3, the Box-Behnken design of the factors selects configurations to sample that are at the midpoints of the edges of the design space and at the center. This design requires at least three factors with at least three levels each. Since the effect of the factors on the dependent variable is not linear, the Box-Behnken design is attractive because it allows for quadratic response surface fitting. The number of samples required for a Box-Behnken design may be $2k(k-1)+C$, where k represents the number of factors and C the number of center points. For some embodiment with three factors for a core, the (3, 3, 3) center point may be included in the Box-Behnken design of the factors, which results in 13 required samples.

As illustrated by the right figure in FIG. 3, a class of fractional factorial design of the factors called $3^{k-p}$ design, where k is the number of factors and 3 represents the number of levels of each factor, is also considered. A $3^{k-1}$ design reduces the number of samples by three, and $3^{k-2}$ reduces the number of samples by nine. Since it is unfeasible to construct an accurate response surface for three factors using only three samples, a $3^{k-1}$ design, referred to as 3MM3 ("3 Minus Modulus 3") and shown in FIG. 3 (right), may be considered. The 3MM3 design may require only nine samples compared to 13 for the Box-Behnken design of the factors.

As illustrated above, during the configuration sampling phase, an application or a workload runs for short sampling periods on the multiple cores of the processor to collect a set of sampled data which are measured responses running on different combination of enabled lanes. The measured responses are not only a function of the change in microarchitecture but also of the temporal fluctuations in application behavior. If these temporal fluctuations are large, the samples become "noisier" and thus the response surfaces are less accurate.

Figure 4:
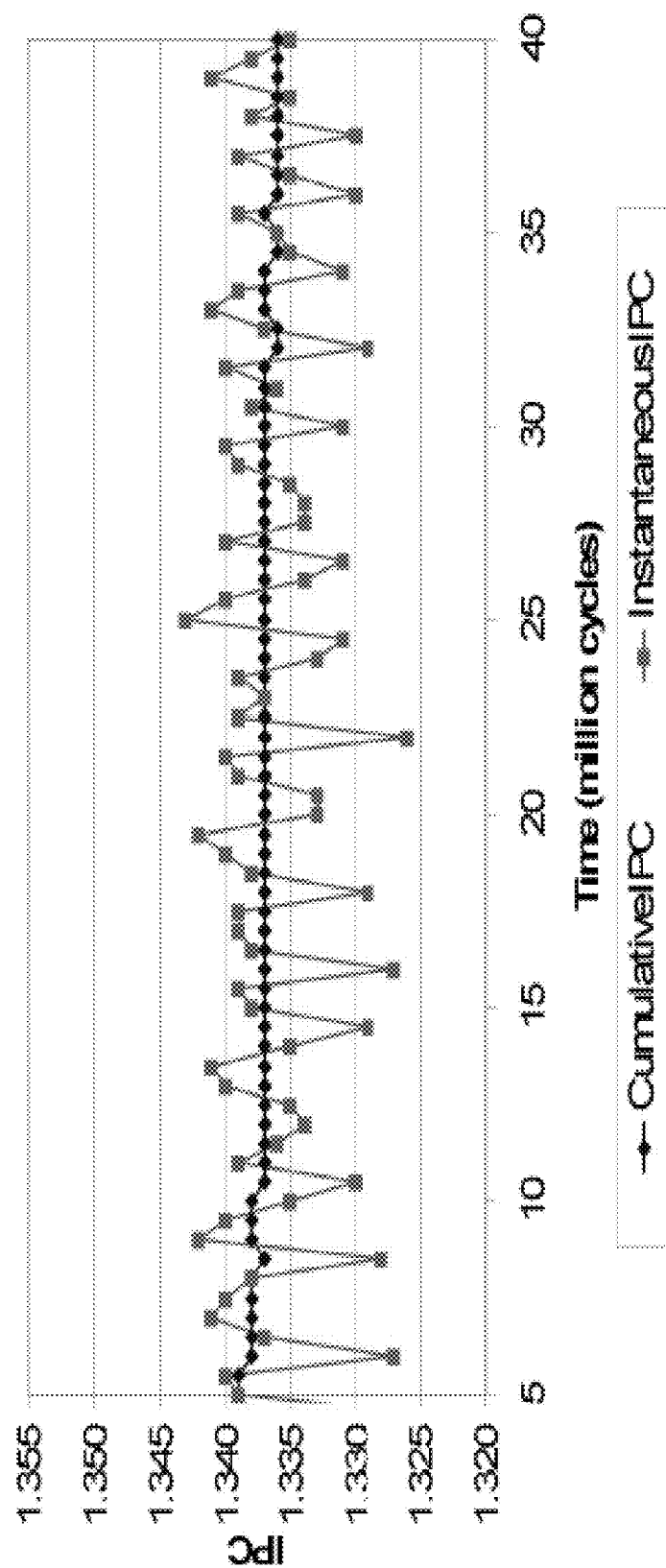
FIG. 4 illustrates an example of sampling noises.

FIG. 4 illustrates one such noise for one of the workload benchmark, the applu benchmark, which is a part of the SPEC CPU2000 Benchmarks used widely to evaluate processor performance. The applu benchmark contains program code that are solutions of five coupled nonlinear PDE's, on a 3-dimensional logically structured grid. FIG. 4 shows that there is a wide variations (noise) of the IPC during execution of applu, among different sampling points, temporal fluctuations of the samples caused by the temporal fluctuations in application behavior.

The noises in the sampled data can be addressed by increasing the size of the samples, but doing so increases sampling overhead which also reduces the length of the steady phase when the processor can operate.

Figure 5:
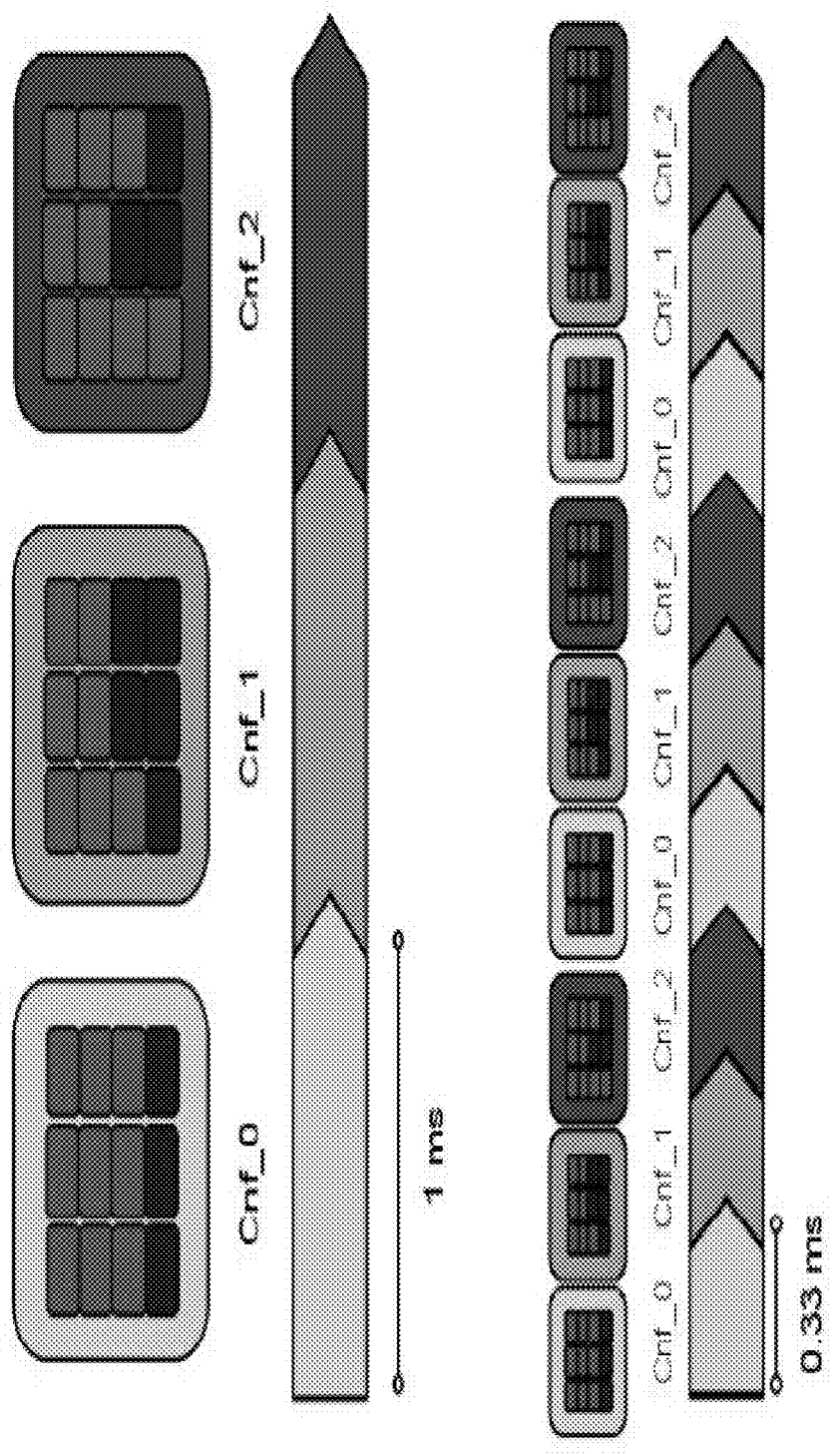
FIG. 5 illustrates an example of replicated sampling approach.

FIG. 5 illustrates an alternative replicated sampling approach, where multiple smaller samples (replicates) of each configuration are taken at different points and then averaged. In other words, for a given configuration of various powered on lanes within multiple cores, multiple samples are taken and the result data are averaged. In some embodiments, a typical sampling approach may be used where each configuration of the different lanes powered up or down within different cores may run once for a 1 ms period, as shown at top of FIG. 5. Alternatively, as shown at the bottom of FIG. 5, an 1 ms sample period is split into three sub-periods with a duration of ⅓ ms. Samples corresponding to the same configurations are evaluated at slightly different points in the application and their responses averaged, which filters out high frequency noise.

The above use of 3 replicates is an example and other number of replicates may be used depending on the specific application requirements. For example, in some implementations, 8 replicates may be used during the period of the workload running on the same configuration of the lanes within different cores. As the number of replicates increases, high frequency noise may be effectively filtered. On the other hand, the smaller intervals between samples can have other impacts such as higher overhead in taking the samples, and certain events, e.g., cache misses and branch prediction errors, are less smoothed out. Therefore the exact number of replicates to be used may depend on the workload and the architecture of the cores.

As demonstrated above, during the configuration sampling phase, an application or a workload runs for short sampling periods on the multiple cores of the processor to collect a set of sampled data, each of which has a different combination of enabled lanes. The number of different combination of enabled lanes may be represented by full factorial design of the factors, a Box-Behnken design of the factors, or a fractional factorial design of the factors. The sampling interval may be the same as the interval the workload is running. Alternatively, shorter sampling interval can be used, which results in the multiple replicates. All the sampled data are the responses to the multivariate statistical experimental design to model the performance or power of the workload running on the processor with multiple cores.

During the surrogate surface fitting phase, a performance response surface model or a power response surface model may be constructed to fit to the set of sampled data. In some embodiments, the performance response surface model or the power response surface model may be constructed using a first order polynomial, a second order polynomial, or an interpolating model that places a Radial Basis Function (RBF) at each sampled datum. In some embodiment where a core includes three power regions as demonstrated earlier, two meta-models, T(x1; x2; x3) and P(x1; x2; x3) may be constructed to approximate the throughput and power responses, where the variables X1, X2, and X3 may represent the three power regions of a core: the front end, the execute, and the memory.

In some embodiments, a simple response surface model such as a first order polynomial, or a second order polynomial may not be accurate enough to predict the responses of the system, or have too many computations. Moreover, both first and second order polynomial functions are non-interpolating: the values on the response surface are not necessarily equal to the values obtained during sampling. An interpolating model that places a RBF at each sampled point overcomes the limitations of simpler response surfaces. Moreover, the approach requires no offline training and very little state. In some embodiments, a response surface model constructed based on an interpolating model requires only 45 unique matrix elements (integers) for 3MM3 fractional factorial designs and 91 for Box-Behnken designs, which are fixed and independent of the workload.

Once meta-models T and P are constructed to fit the sampled data obtained from sampling the workload running on each core, Flicker moves to the optimization phase. During the optimization phase, the online optimization algorithm using an objective function based on the response surface models determines the combination of powered lanes within different cores of the processor that optimizes performance under the power constraint budget for the workload. In some embodiments, when a core has 3 power regions and a power region has 4 lanes, a core can be configured in 27 ways, and an N core system will have a total of $27^N$ possible sets of core configurations, making runtime exhaustive search of the space impractical for even modest values of N. To permit the operating system to have the flexibility to temporally reschedule threads within a reasonable time granularity (tens to hundreds of milliseconds), and given the time required for sampling, an optimization algorithm may converge to a near-optimal combination of enabled lanes with a runtime no longer than a few milliseconds.

In some embodiments, the optimization algorithm solves the constrained integer global optimization problem to obtain a solution maximizing performance under a given power constraint budget. In order to take fairness into account, the geometric mean throughput may be chosen as the performance objective function:

$$f(\vec{x}) = \sqrt[N]{\prod_{i=1}^{N} \hat{T}_i(x_{1_i}, x_{2_i}, x_{3_i})} \quad (1)$$

where N is the number of cores, $\vec{x}$ is a vector of size N consisting of the current configuration for each core, and $\hat{T}_i(x_{1_i}, x_{2_i}, x_{3_i})$ is based on the meta-model T of the $i^{th}$ core.

The objective function further has the constraint of meeting a certain power constraint budget. In some embodiments, a constraint handling method may differentiate between feasible and infeasible (over power constraint budget) solutions by penalizing configurations that consume more power than allowed, ensuring that infeasible solutions are never chosen over feasible solutions. The final function may have the form:

$$F(\vec{x}) = \begin{cases} f(\vec{x}) = & \text{if } g(\vec{x}) \leq \text{max}Power \\ 1 - g(\vec{x}) = & \text{if } g(\vec{x}) > \text{max}Power \end{cases} \quad (2)$$

where $g(\vec{x})$ is the constraint violation function and is defined as the current power consumption of the entire core:

$$g(\vec{x}) = \Sigma_{i=1}^{N} \hat{P}_i(x_{1_i}, x_{2_i}, x_{3_i})$$

The solution for the objective function is the vector $\vec{x}$, the configuration of each core that results in the best global performance. The solution vector consists of discrete rather than continuous variables, which makes it difficult to apply classical mathematical techniques such as derivative or limit-based methods, instead heuristic algorithms may be used.

In some embodiments, heuristic algorithms may be used to effectively search complex spaces, trading the computational time at the expense of solution accuracy. For example, the genetic algorithm may be used in some embodiments, which uses information gathered from past searches about an unknown space to bias future searches towards more useful subspaces. Each core configuration is encoded as one gene of a chromosome, and each gene takes the integer values 0 to C−1, where C is the number of possible configurations for each core. A combination of N genes form one chromosome of a population, where N is the number of cores. Other heuristic algorithms may be used as well for some other embodiments besides the genetic algorithm.

In some embodiment when the genetic algorithm is used, tournament selection with replacement is used to pick the mating pool, with two children from each parent pair created using single point crossover at the boundary of the genes and a high mutation probability. To prevent the algorithm from losing the current best solution, elitism is implemented by replacing a random child with the best parent. A variety of parameter values are explored offline and a desirability function constructed in order to find parameters that would optimize the algorithm over a variety of power constraints. In some embodiments, the following parameters may be used for the genetic algorithm: a population size of 20 individuals, a crossover probability of 0.9, and a mutation probability of 0.6. The simulation may run for 25 generations (which corresponds to 500 objective function evaluations) as a compromise between algorithm accuracy and computation time, and consumes 1% of the 100 ms interval for a 32 core configuration. Those parameters are just for example, and not limiting. Those and any other genetic algorithms can be applied by Flicker to find a near optimal solution.

In some embodiments, various evaluations have been performed to validate the effectiveness of the disclosed methods and systems. The evaluation methodology may use various computer architecture evaluation tools to gather the performance and power related data, such as enhanced versions of SuperESCalar Simulator (SESC), Wattch (an architecture power modeling tool), Cacti (a tool that helps designers determine cache access times, power/energy consumption), and HotLeakage (thermal modeling tool). In some embodiments, an extensive design space study may be performed to determine a balanced baseline core microarchitecture whose parameters are shown in Table 1.

TABLE 1

| Architectural parameters. | |
| --- | --- |
| Front End | Branch Predictor: gshare + bimodal |
| | 64 entry RAS, 2 KB BTB |
| | 128 entry ROB |
| | 4-wide fetch/decode/rename/retire |
| Execution | out-of-order, 4-wide issue/execute |
| Core | 80 Integer Registers, 80 FP Registers |
| | 32 entry Integer Queue, 24 entry FP Queue |
| | 32 entry Load Queue, 16 entry Store Queue |
| | 4 Integer ALUs, 1 Integer Mult/Div Unit |
| | 1 FP ALU, 1 FP Mult/Div Unit |
| On-chip | L1 Instruction Cache: 8 KB, 2-way, 2 cycles |
| Caches | L1 Data Cache: 8 KB, 2-way, 2 cycles |
| | L2 Cache: 1 MB, private, 8-way, 15 cycles |
| Memory | 200 cycle latency |
| Operating | TV Vdd |
| Parameters | 4.0 GHz frequency |

In some embodiments, various evaluations have been performed to validate the effectiveness of the disclosed methods and systems. The workload used in the evaluation may include workload constructed by randomly selecting one of 13 SPEC CPU 2000 benchmarks (applu, wup-wise, mesa, mgrid, ammp, apsi, twolf, crafty, parser, vpr, vortex, bzip2, and gcc) to run on each core. Each benchmark workload runs with the reference input set and runs for 100 ms, the length of a time slice. The workload may run on a processor comprising 32 cores. The system may be evaluated at eight different power constraint budgets, from 90% to 55% of the nominal power. The baseline system for the comparison simply shuts down cores to meet the given power constraint budget.

Figure 6:
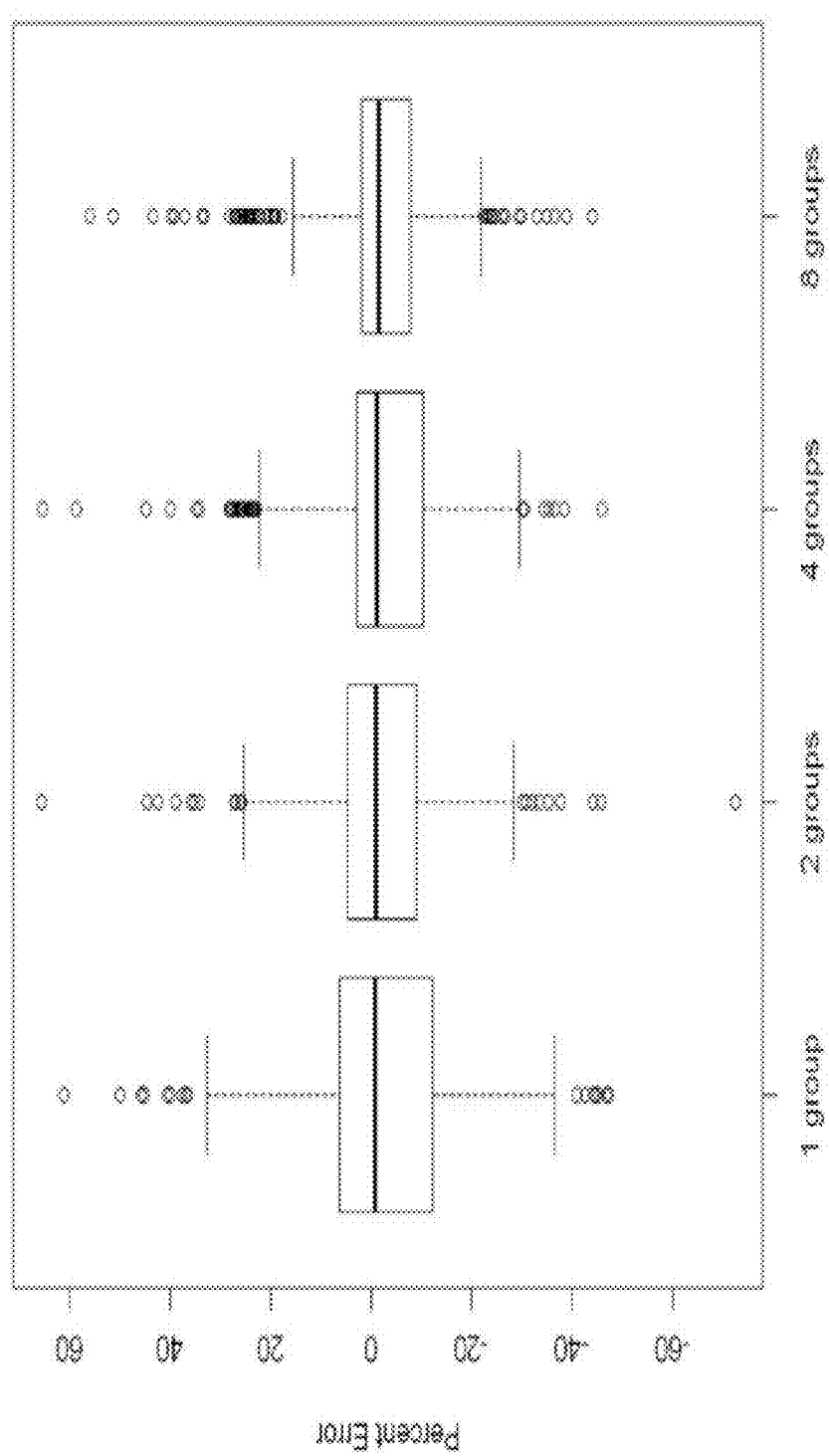
FIG. 6 illustrates the estimation error of the results produced by Flicker as compared to the real responses running the workload on a configuration of multiple cores.

FIG. 6 illustrates the estimation error of Flicker for the throughput function as compared to the real response which is the result when running the workload on the configuration of various lanes within the multiple cores for the full time slice interval, such as 100 ms in some embodiment. Various replicated samplings have been tested, ranging from no replicates and up to eight replicates across all benchmarks. For each configuration, which is a combination of enabled lanes within the multiple cores, the error is measured as the percent difference between the real response and the average response of the replicated samples.

On one hand, more replicated samples reduce high frequency noise by obtaining responses at different points of the benchmark execution. However, the smaller samples are more susceptible to noise caused by cache misses, branch mis-predictions, and small software loops. As shown in FIG. 6, sampling accuracy increases with the increase of the number of replicated samples from none to eight. The spread between the 25th and 75th percentiles narrows considerably with eight replicated samples compared to no replication. The mean error is close to zero, indicating that sampling on average accurately captures the true response of the system. Power estimation shows similar results.

Figure 7:
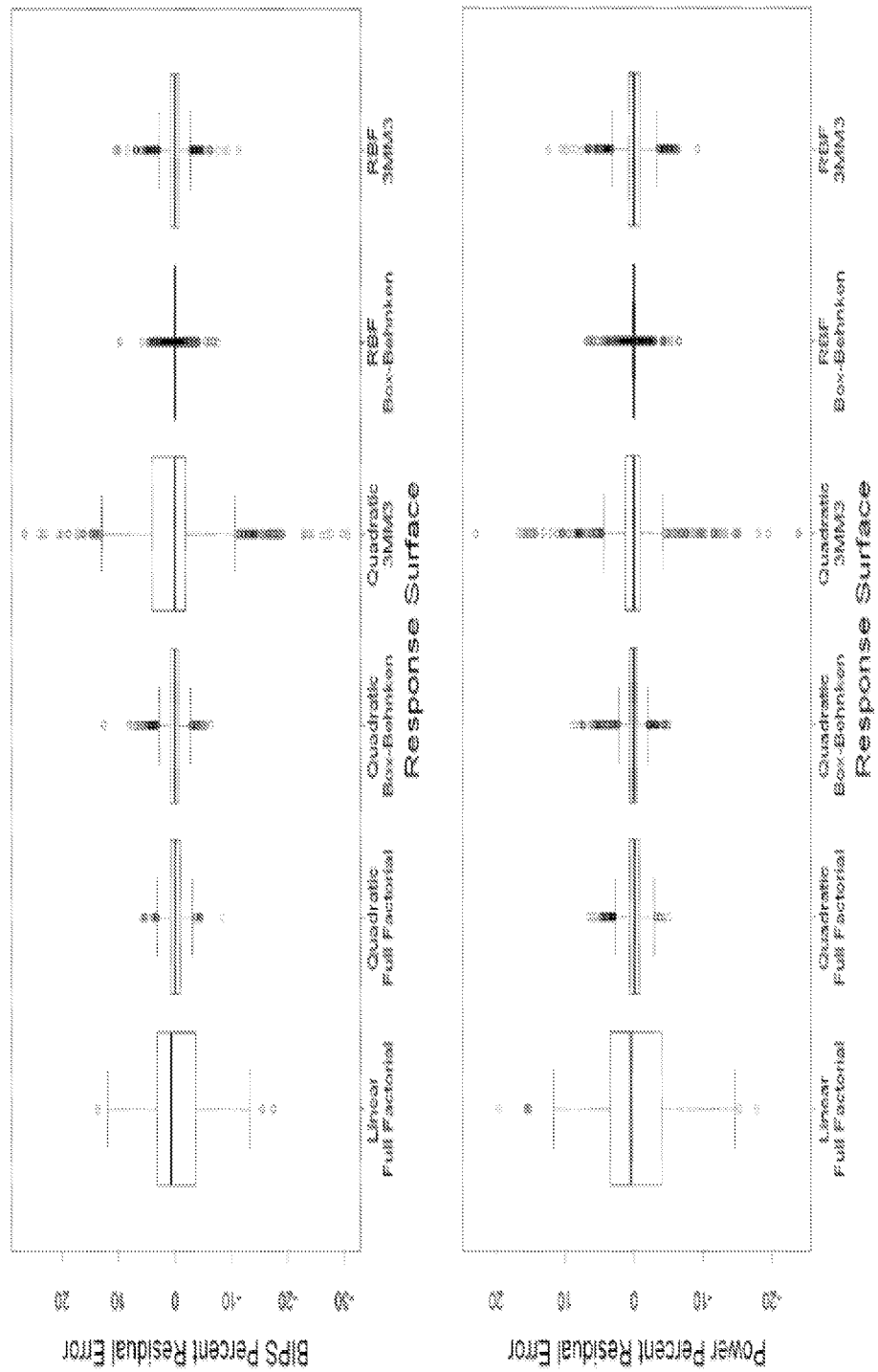
FIG. 7 illustrates a comparison of the accuracy of the response surface models for characterizing throughput and power samples.

FIG. 7 illustrates a comparison of the accuracy of the response surface models for characterizing throughput and power samples for some embodiments described earlier in this document. The y-axis represents the percentage by which the predicted responses deviate from the real responses, and each box plot depicts statistics collected across all benchmarks. For each workload, a response surface is built on the full factorial (27 points), Box-Behnken (13 points), and the 3MM3 (nine points) designs. Real responses are used instead of short samples for the observation points to isolate the effects of the response surface models fitting from sampling error.

As illustrated in FIG. 7, even when constructed using the full factorial design, the linear model fits the data the worst, with a residual percent error as high as 15-20% in both directions, meaning that responses are both overestimated and underestimated. The fitting of a quadratic surface to the full factorial observations reduces both throughput and power error. The Box-Behnken design yields very good results, with only a slight increase in the number of outliers.

The prediction accuracy dramatically worsens when building the quadratic surface on only nine observation points (3MM3 design), since a quadratic response surface for three variables requires ten coefficients, which cannot be obtained using only nine samples.

Since the RBF response surface is an interpolating model, the residual error is zero if the RBF surface is built using the full factorial design (not shown in the graph). The use of fewer observations points from the Box-Behnken design to create an RBF response surface model produces very accurate results, with a small spread and relatively few outliers. 3MM3 provides far more accurate results with an RBF response surface rather than a quadratic response surface, but accuracy degrades relative to the Box-Behnken design with RBF response surface due to the fewer number of observation points.

As demonstrated in FIG. 7, the combination of Box-Behnken design of the factors, eight-way replicated sampling, and RBF response surface models provides accurate performance and power models for use during optimization with modest runtime overhead.

Figure 8:
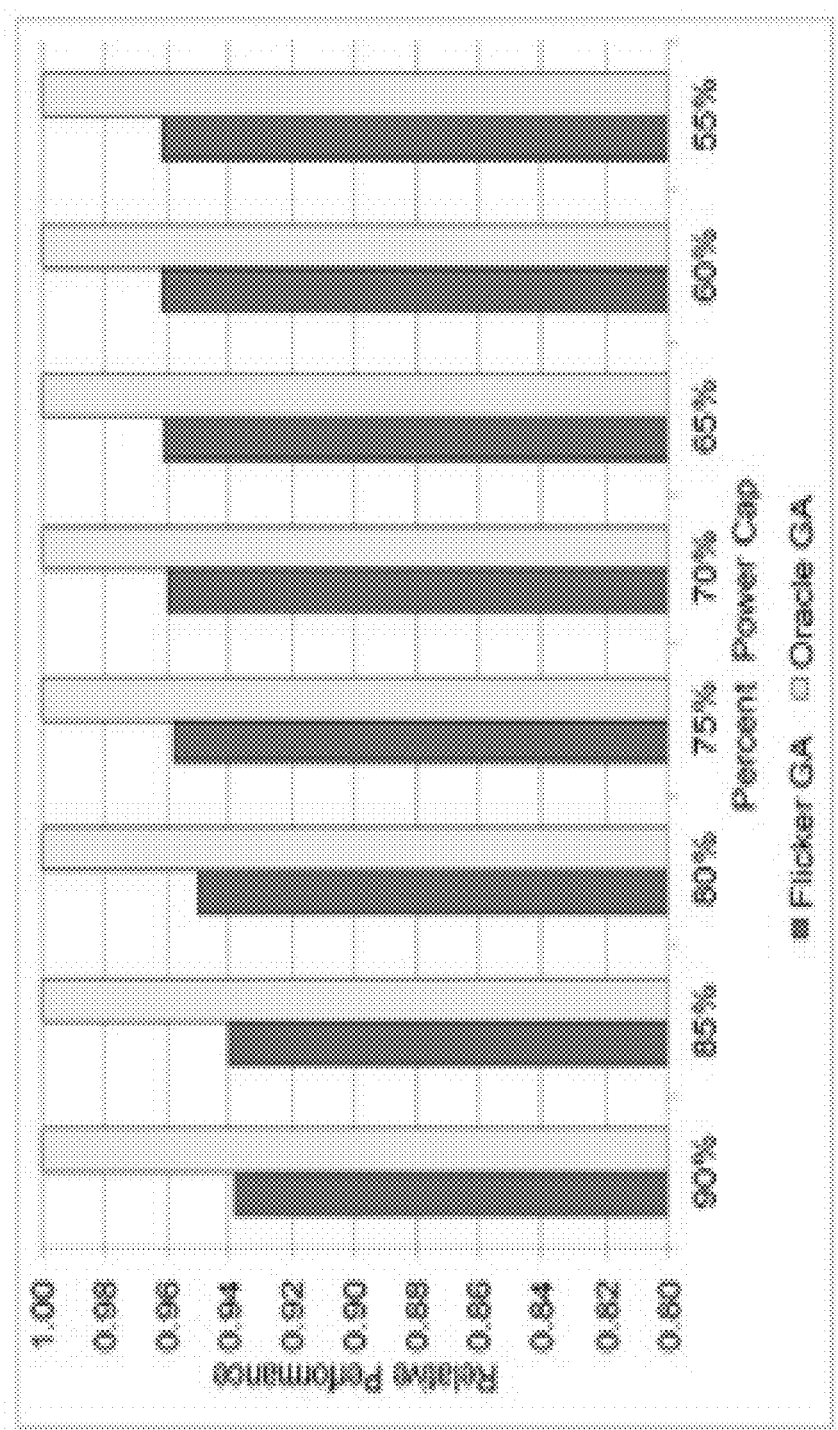
FIG. 8 illustrates a comparison between the optimization result produced by Flicker and the optimization result produced by an offline optimization algorithm.

FIG. 8 illustrates an evaluation result of Flicker's online optimization algorithm as compared to an offline optimization algorithm. Flicker algorithm was implemented using the full time slice (100 ms) power and throughput responses to eliminate sampling error, on the full factorial design to eliminate errors due to response surface approximation, running the genetic algorithm. As shown in FIG. 8, Flicker's online algorithm closely matches the results of the offline algorithm, with a worse case degradation around 6%.

Interestingly, Flicker's accuracy improves with increasingly stringent power constraints. At relaxed power caps, there are many possible solutions with a wide range of good solutions. Thus, the errors from sampling and surface fitting are more pronounced, because the genetic algorithm is free to pick any configurations as parents for the next generation. At more stringent power caps, there are fewer viable solutions. Therefore, the space from which to choose individuals to reproduce (parents) is reduced, and Flicker's accuracy improves as allocated power diminishes.

Figure 9:
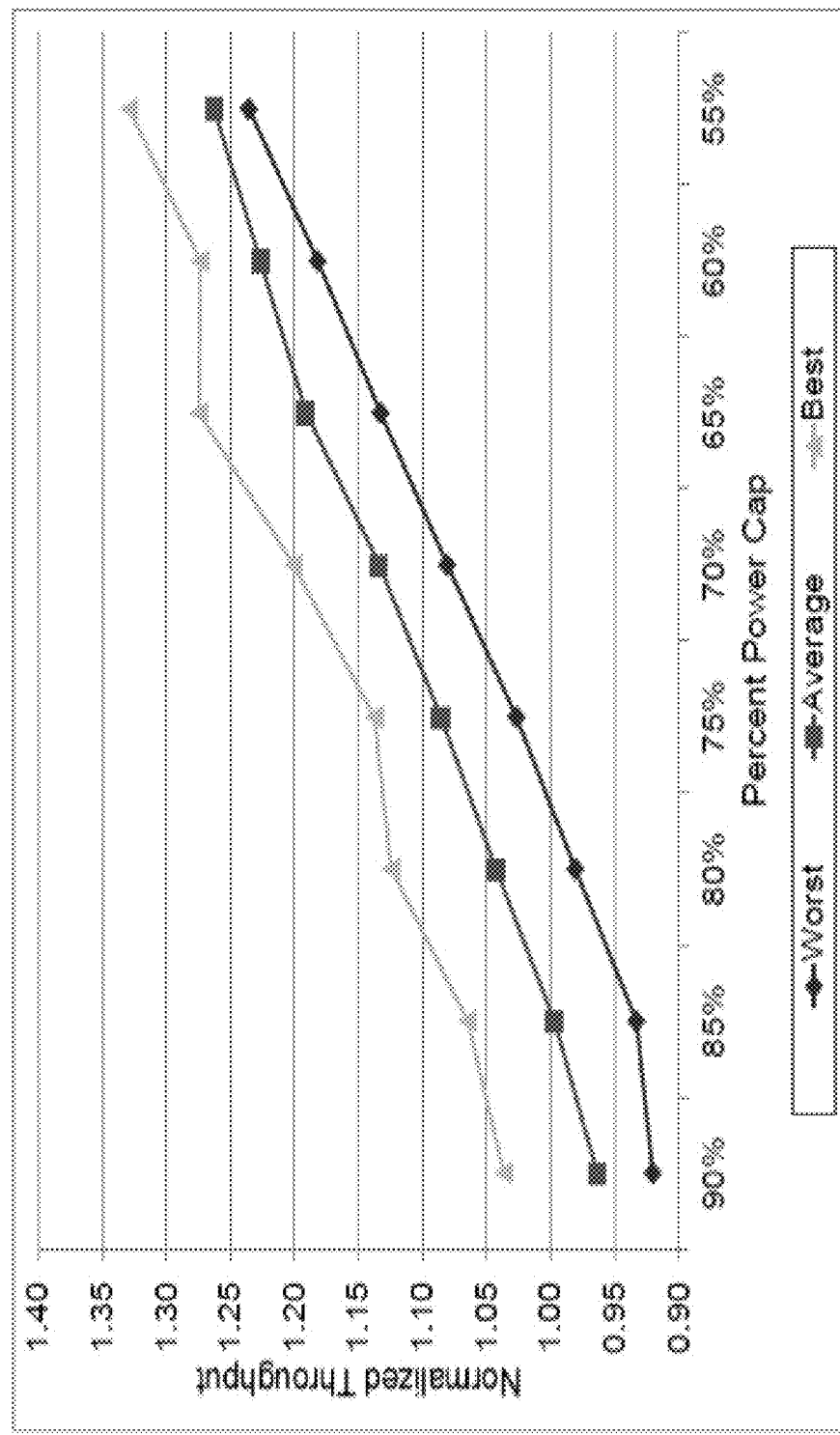
FIG. 9 illustrates a performance comparison between Flicker and a conventional core-level gating for power management of multiple cores within a processor.

FIG. 9 illustrates the performance comparison between Flicker approach and a conventional core-level gating for different power allocations, from 90% to 55% of the nominal power. At 90% power allocation, core-level gating is highly effective, and slightly outperforms Flicker overall. At higher power allocations, it may be sufficient to gate 1-2 cores, or perhaps none if the workload has a number of memory bound applications. The overheads associated with sampling and approximation, in terms of estimation error and the time spent in suboptimal configurations during sampling, makes Flicker less effective, and core-level gating preferable, at high power allocations.

As the power constraint increases, core-level gating blindly treats all applications the same in terms of hardware allocation, while Flicker's lane-level configuration more precisely matches the hardware to individual application characteristics. Moreover, as shown earlier, Flicker's accuracy increases as the power constraint becomes more stringent. At a 55% power cap, Flicker outperforms core-level gating by an average of 27%.

Figure 10:
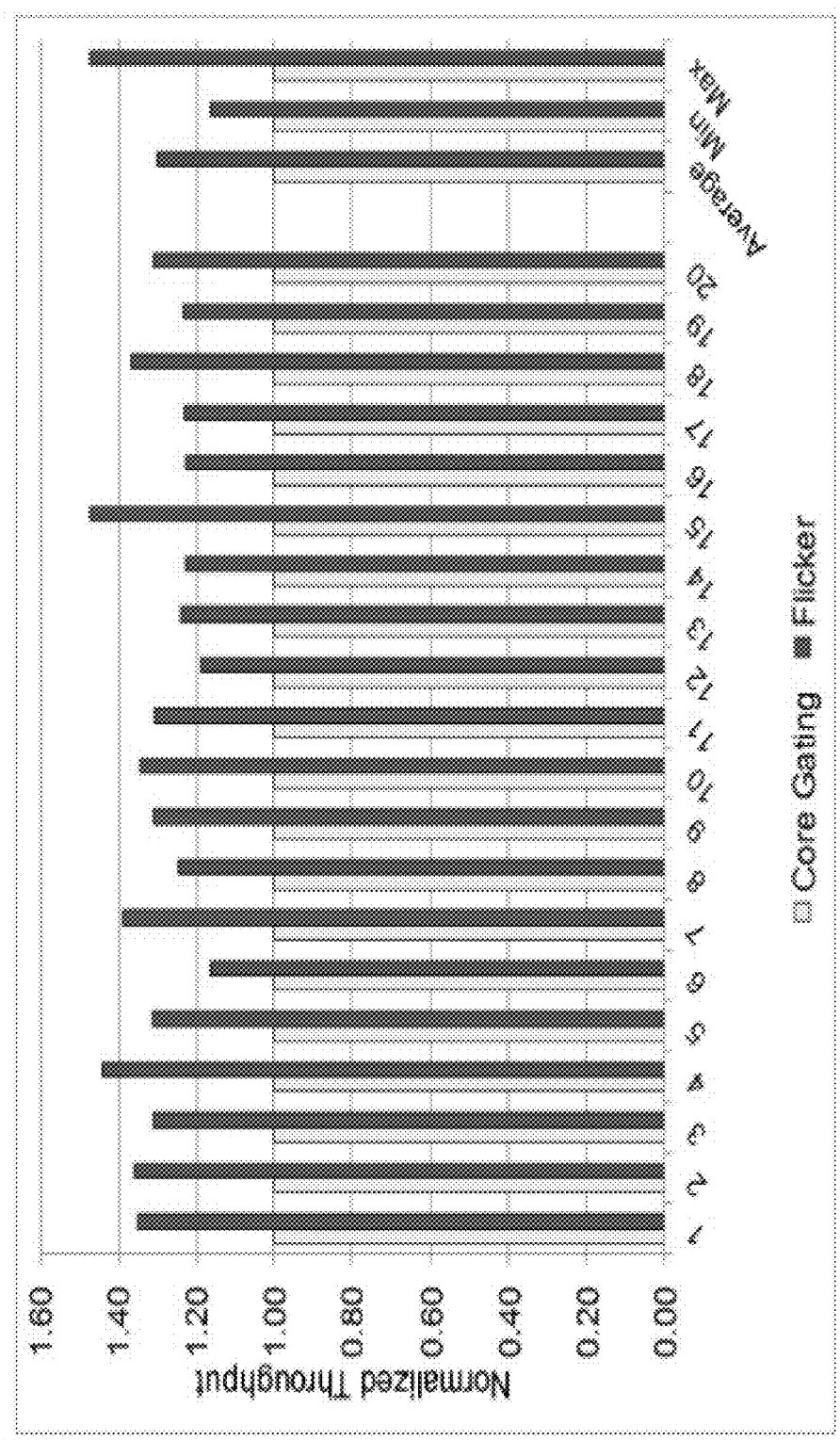
FIG. 10 illustrates a performance comparison between Flicker and a conventional core-level gating for power management of multiple cores within a processor for a parallel workload.

FIG. 10 illustrates a performance comparison of Flicker compared to the core-level gating for a parallel application. For a parallel application in which identical homogeneous threads are operating in parallel, global optimization is simplified, since core configurations for the threads should be identical for different cores. An optimization algorithm with knowledge of the application structure need only consider one thread of the application during these periods of homogeneous parallel execution. For example, a 32 core Flicker system running four applications, each with eight homogeneous threads, makes similar decisions as a four core system running four single-threaded applications. Once the configuration is determined for one of the application's threads, the cores for the remaining threads are identically configured. The decision space for a parallel workloads is simplified, making the search more efficient compared to workloads of single-threaded applications.

In addition, a parallel workload may be constructed from four randomly selected benchmarks with each replicated eight times. Twenty such workloads may be created, for which the optimization algorithm samples and builds response surface models for only the four unique benchmarks at one-eighth of the global power constraint, which simplifies the search. The performance of each of the 20 workloads at a 55% power constraint budget relative to core-level gating is shown in FIG. 10. The average performance improvement at this power cap is 30%, which is an improvement over the sequential application workloads.

In the above examples of implementing the disclosed technology, a lane within a processors core can be powered off or powered down based on the operating needs. In other implementations, lanes within a core may not be completely powered on or off but the power level in the lanes may be controlled by power gating operations, e.g., the powered off or powered down of lanes may be "gating off" of lanes rather than "powering down" of lanes. Such power gating control over the lanes may be implemented by different means including, e.g., clock gating, power gating, or voltage scaling.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for managing power in a processor having multiple cores, wherein each core of the multiple cores includes different partitioned power regions and each power region of the partitioned power regions is partitioned into multiple lanes with each lane of the multiple lanes including a sub-bank of an associated queue and processor components, comprising:

controlling power to the processor by independently turning on or off electrical power to all lanes in the processor respectively, wherein the all lanes include a sum of the multiple lanes of the partitioned power regions in the multiple cores, wherein the turning on or off the electrical power to all lanes includes turning on or off the electrical power to components within each lane of the all lanes;

applying an optimization mechanism within a time slice to determine a combination of powered-on lanes of the all lanes within different cores of the multiple cores of the processor that optimizes performance of the processor under a power constraint budget, wherein the optimization mechanism includes a configuration sampling phase, a surrogate surface fitting phase, an optimization phase, and a steady phase in the time slice and further comprises:

running a workload for a sample period during the configuration sampling phase on the multiple cores of the processor to collect a set of sampled data for each individual core of the multiple cores;

constructing a response surface model for each individual core, wherein the response surface model comprises an interpolating model of the partitioned power regions, and is fit to the set of sampled data for the corresponding individual core during the surrogate surface fitting phase;

determining, based on an online optimization algorithm using an objective function based on the response surface models for the individual cores, the combination of powered-on lanes of the all lanes within different cores of the multiple cores of the processor that optimizes performance under the power constraint budget for the workload during the optimization phase, wherein the response surface model for each individual core is different from the objective function.

2. The method of claim 1, wherein:
the partitioned power regions include three power regions each comprising a plurality of pipeline stages: a front end region, an execute region, and a memory region.

3. The method of claim 2, wherein:
the front end region includes a fetch, a decode, a reorder buffer, a rename, and a dispatch stage;
the execute region includes an issue queue, a register file, and a functional unit; and
the memory region includes a load queue and a store queue.

4. The method of claim 1, wherein:
a lane of the multiple lanes further includes a physical gating mechanism and a logical correctness mechanism.

5. The method of claim 4, wherein the physical gating mechanism includes a sleep transistor for power gating.

6. The method of claim 1, wherein the processor includes 32 cores.

7. The method of claim 1, wherein the time slice is greater than or equal to 100 ms.

8. The method of claim 1, wherein:
the response surface models are performance response surface models or power response surface models;
the processor operates under the combination of powered lanes within different cores during the steady phase; and
the configuration sampling phase, the surrogate surface fitting phase, and the optimization phase together are within a fraction of the time slice.

9. The method of claim 8, wherein:
the online optimization algorithm that optimizes performance under the power constraint budget for the workload is applied to a multivariate statistical experimental design with a set of responses and a set of factors;
a response of the set of responses is a sampled datum collected from the workload running for the sampling period; and
a factor of the set of factors is a power region of the partitioned power regions in a core of the multiple cores.

10. The method of claim 9, wherein the response of the set of responses is a sampled throughput datum or a sampled power consumption datum collected from the workload running for the sampling period.

11. The method of claim 9, wherein:
the partitioned power regions include three power regions each comprising a plurality of pipeline stages: a front end region, an execute region, and a memory region; and
the factor of the set of factors is the front end region, the execute region, or the memory region.

12. The method of claim 11, wherein the response of the set of responses is the sampled datum collected from the workload runs for the sampling period on a full factorial design of the factors, a Box-Behnken design of the factors, or a fractional factorial design of the factors.

13. The method of claim 12, wherein the response of the set of responses is the sampled datum collected from the workload running for a 1 ms sampling period.

14. The method of claim 12, wherein the response of the set of responses is an average of the set of sampled data collected for a plurality of subintervals of the sampling period.

15. The method of claim 8, wherein the performance response surface models or the power response surface models are constructed using a first order polynomial, a second order polynomial, or an interpolating model that places a Radial Basis Function (RBF) at each sampled datum.

16. The method of claim 8, wherein the online optimization algorithm incorporates a genetic algorithm.

17. A system having a computer processor having multiple cores, comprising:
a processor including multiple cores, each core of the multiple cores being a computer processor core and being partitioned into multiple power regions, wherein each power region of the multiple power regions is further partitioned into multiple lanes and each lane of the multiple lanes includes a sub-bank of an associated queue;
a first storage storing a power constraint budget for a workload to be performed by the system;
a second storage storing the workload; and
a controller coupled to the first and second storages and all lanes in the processor, wherein the all lanes include a sum of the multiple lanes of the multiple power regions in the multiple cores, the controller operable to adopt an optimization mechanism to determine, within a time slice, a combination of powered-on lanes of the all lanes within different cores of the multiple cores of the processor that optimizes performance under the power constraint budget for the workload, wherein components within each lane of the all lanes are powered on or off together under a control of the controller, and wherein the optimization mechanism includes a configuration sampling phase, a surrogate surface fitting phase, an optimization phase, and a steady phase in the time slice and further comprises:
running a workload for a sample period during the configuration sampling phase on the multiple cores of the processor to collect a set of sampled data for each individual core of the multiple cores;
constructing a response surface model for each individual core, wherein the response surface model comprises an interpolating model of the multiple power regions, and is fit to the set of sampled data for the corresponding individual core during the surrogate surface fitting phase;
determining, based on an online optimization algorithm using an objective function based on the response surface models for the individual cores, the combination of powered-on lanes of the all lanes within different cores of the multiple cores of the processor that optimizes performance under the power constraint budget for the workload during the optimization phase, wherein the response surface model for each individual core is different from the objective function.

18. The system of claim 17, wherein:
the partitioned power regions include three power regions each comprising a plurality of pipeline stages: a front end region, an execute region, and a memory region.

19. The system of claim 18, wherein:
the front end region includes a fetch, a decode, a reorder buffer, a rename, and a dispatch stage;
the execute region includes an issue queue, a register file, and a functional unit; and
the memory region includes a load queue and a store queue.

20. The system of claim 17, wherein:
a lane of the multiple lanes further includes a physical gating mechanism and a logical correctness mechanism.

21. The system of claim 20, wherein the physical gating mechanism includes a sleep transistor for power gating.

22. The system of claim 17, wherein the processor includes 32 cores.

23. The system of claim 17, wherein the time slice is greater than or equal to 100 ms.

24. The system of claim 17, wherein:
the response surface models are performance response surface models or power response surface models;
the processor operates under the combination of powered lanes within different cores during the steady phase; and
the configuration sampling phase, the surrogate surface fitting phase, and the optimization phase together are within a fraction of the time slice.

25. The system of claim 24, wherein:
the online optimization algorithm that optimizes performance under the power constraint budget for the workload is applied to a multivariate statistical experimental design with a set of responses and a set of factors;
a response of the set of responses is a sampled datum collected from the workload running for the sampling period; and
a factor of the set of factors is a power region of the multiple power regions in a core of the multiple cores.

26. The system of claim 25, wherein the response of the set of responses is a sampled throughput datum or a sampled power consumption datum collected from the workload running for the sampling period.

27. The system of claim 25, wherein:
the partitioned power regions include three power regions each comprising a plurality of pipeline stages: a front end region, an execute region, and a memory region; and
the factor of the set of factors is the front end region, the execute region, or the memory region.

28. The system of claim 27, wherein the response of the set of responses is the sampled datum collected from the workload running for the sampling period on a full factorial design of the factors, a Box-Behnken design of the factors, or a fractional factorial design of the factors.

29. The system of claim 28, wherein the response of the set of responses is the sampled datum collected from the workload running for a 1 ms sampling period.

30. The system of claim 28, wherein the response of the set of responses is an average of the set of sampled data collected for a plurality of subintervals of the sampling period.

31. The system of claim 24, wherein the performance response surface models or the power response surface models are constructed using a first order polynomial, a second order polynomial, or an interpolating model that places a Radial Basis Function (RBF) at each sampled datum.

32. The system of claim 24, wherein the online optimization algorithm incorporates a genetic algorithm.

33. A method for managing power in a processor having multiple cores, wherein each core of the multiple cores includes different partitioned power regions and each power region of the partitioned power regions is partitioned into multiple lanes with each lane of the multiple lanes including a sub-bank of an associated queue and processor components, comprising:
controlling power to the processor by independently controlling electrical power to all lanes in the processor respectively, wherein the all lanes include sum of the multiple lanes of the partitioned power regions in the multiple cores;
controlling power levels supplied to components within each lane of the all lanes by a gating control; and
applying an optimization mechanism within a time slice to determine a combination of powered-on lanes of the all lanes within different cores of the multiple cores of the processor that optimizes performance of the processor under a power constraint budget, wherein the optimization mechanism includes a configuration sampling phase, a surrogate surface fitting phase, an optimization phase, and a steady phase in the time slice and further comprises:
running a workload for a sample period during the configuration sampling phase on the multiple cores of the processor to collect a set of sampled data for each individual core of the multiple cores;
constructing a response surface model for each individual core, wherein the response surface model comprises an interpolating model of the partitioned power regions, and is fit to the set of sampled data for the corresponding individual core during the surrogate surface fitting phase;
determining, based on an online optimization algorithm using an objective function based on the response surface models for the individual cores to solve a constrained integer global optimization problem, the combination of powered-on lanes of the all lanes within different cores of the multiple cores of the processor that optimizes performance under the power constraint budget for the workload during the optimization phase, wherein the response surface model for each individual core is different from the objective function.

34. The method of claim 33, wherein the gating control in controlling electrical power to a lane is by clock gating, power gating, or voltage scaling.

* * * * *